(12) United States Patent
Loeffler et al.

(10) Patent No.: US 8,773,055 B2
(45) Date of Patent: Jul. 8, 2014

(54) ONE-PHASE ELECTRONICALLY COMMUTATED MOTOR

(75) Inventors: Jens Loeffler, Villingen-Schwenningen (DE); Henry Weissbach, Uehlingen-Birkendorf (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 371 days.

(21) Appl. No.: 12/981,606

(22) Filed: Dec. 30, 2010

(65) Prior Publication Data
US 2011/0169437 A1 Jul. 14, 2011

Related U.S. Application Data

(63) Continuation-in-part of application No. 12/830,492, filed on Jul. 6, 2010, now Pat. No. 8,294,398.

(30) Foreign Application Priority Data

Jan. 12, 2010 (DE) .......................... 10 2010 004 362

(51) Int. Cl.
*H02P 6/18* (2006.01)

(52) U.S. Cl.
USPC ..................................... 318/400.34; 318/459

(58) Field of Classification Search
USPC ................. 318/459, 500, 400.34, 400.32
See application file for complete search history.

(56) References Cited

U.S. PATENT DOCUMENTS

| | | | |
|---|---|---|---|
| 4,459,519 A * | 7/1984 | Erdman | 318/400.08 |
| 5,757,100 A | 5/1998 | Burgbacher | 310/186 |
| 5,796,194 A * | 8/1998 | Archer et al. | 310/68 B |
| 5,859,519 A * | 1/1999 | Archer | 318/801 |
| 6,046,554 A * | 4/2000 | Becerra | 318/400.34 |
| 6,396,227 B2 * | 5/2002 | Sasaki | 318/283 |
| 7,091,643 B2 | 8/2006 | Burgbacher | 310/156 |
| 7,397,215 B2 | 7/2008 | Lelkes | 318/599 |

(Continued)

FOREIGN PATENT DOCUMENTS

| | | |
|---|---|---|
| DE | 102004-027800 | 1/2006 |
| DE | 102005-035451 | 2/2006 |
| EP | 1596495 | 11/2005 |

OTHER PUBLICATIONS

Micropchip Techn. Inc., "PIC12F629/675 Data Sheet: 8-PIN, Flash-Based 8-BIT CMOS Microcontrollers", excerpt pp. 1-6, retrieved Jul. 1, 2010 from the U.R.L. www.microchip.com.

*Primary Examiner* — Rina Duda
(74) *Attorney, Agent, or Firm* — Milton Oliver, Esq.; Oliver Intellectual Property LLC

(57) ABSTRACT

An electronically commutated one-phase motor (20) has a stator having at least one winding strand (30, 32) and a permanent-magnet rotor (22). The rotor, as it rotates, induces a voltage ($u_{ind}$) in the at least one winding strand (30, 32). The motor has an electronic calculation device (26), preferably a microcontroller μC, which is configured to execute, during operation, the steps of a) sensing the value of the instantaneous operating voltage (Ub); (b) using the operating voltage value (Ub) and optionally further parameters, adjusting a time duration ($T_{ON}$) of a switch-on current pulse (i30) for the motor, in order to apply a consistent amount of electrical energy to the windings during start-up attempts, thereby maximizing the probability of successful start-up, regardless of possible fluctuations in motor operating voltage and related operating parameters. The switch-on current pulse duration ($T_{ON}$) can be adjusted longer or shorter, as a function of operating experience.

12 Claims, 5 Drawing Sheets

(56) References Cited

U.S. PATENT DOCUMENTS

| | | | |
|---|---|---|---|
| 7,420,307 B2 | 9/2008 | Lelkes et al. | 310/180 |
| 7,554,279 B2 * | 6/2009 | Loffler et al. | 318/400.07 |
| 7,716,018 B2 | 5/2010 | Pecher | 702/190 |
| 2005/0077854 A1 | 4/2005 | Lelkes et al. | 318/439 |
| 2005/0253546 A1 * | 11/2005 | Dornhof | 318/439 |

* cited by examiner

ONE-PHASE ELECTRONICALLY COMMUTATED MOTOR

CROSS-REFERENCE TO RELATED APPLICATIONS

This application is a continuation-in-part of our U.S. application Ser. No. 12/830,492 filed 6 Jul. 2010, now U.S. Pat. No. 8,294,398, and also claims priority from our German application DE 10 2010 004 361.1 filed 12 Jan. 2010.

FIELD OF THE INVENTION

The present invention relates generally to an electronically commutated motor (ECM) and, more particularly, to an ECM with measures to make its start-up more reliable.

BACKGROUND

One-phase electronically commutated motors are very inexpensive, and are often used for specific driving tasks, e.g. for fans or centrifugal pumps. They are usually controlled by means of a Hall sensor which magnetically detects the instantaneous rotational position of the rotor. Commutation without a sensor, referred to using the term "sensorless," is, however, desirable, since better efficiency is obtained as a result.

The terminology of such motors is somewhat confusing. For accurate definition of an ECM, firstly the number of stator current pulses per rotor rotation of 360° el. is indicated, e.g. single-pulse, two-pulse, three-pulse, etc.; also the number of winding strands in the stator is indicated, e.g. single-strand, two-strand, three-strand, etc.

An ECM can therefore e.g. be described as single-strand and two-pulse, or two-strand and two-pulse. The expression "collectorless motor" is also used instead of "ECM". Because there is no difference between the single-strand and two-strand motors in terms of physical operation, and because simplified terminology is always desirable for practical use, such motors are generally referred to as "one-phase" ECMs, even though they can have either only a single strand or, alternatively, two strands.

Because the rotor in such motors has rotational positions at which the motor cannot generate any electromagnetic torque, an auxiliary torque is used that is effective at those zero positions. This can be a magnetically generated auxiliary torque, which is referred to as reluctance torque. Alternatively, this auxiliary torque could be generated mechanically, for example by means of a spring that is tensioned in certain rotational positions and delivers its stored energy at the zero positions. The result is that the rotor, at a standstill, is rotated sufficiently that at startup it is not in a rotational position in which the motor cannot generate an electromagnetic torque, since otherwise the motor would not be able to start. This starting position is also referred to as a "cogging" position.

When such motors are currentless, normally the rotor is at a standstill and is in a so-called cogging position, into which it is pulled by the aforesaid auxiliary torque. When current is applied to the motor with the rotor in this position, the rotor will move; it is, however, only possible to guess how strongly it will move.

SUMMARY OF THE INVENTION

It is therefore an object of the invention to make available a novel electronically commutated motor (ECM) with a reliable minimum rotor movement during start-up.

According to the invention, this object is achieved by sensing the instantaneous motor operating voltage, and using this value to adjust the time duration of a switch-on current pulse applied to the motor. Sensing of the operating voltage creates the possibility of correctly metering energy delivery at startup. This is because energy is delivered at startup as a so-called current-flow block and, by means of the invention, this block can be metered so that, regardless of the instantaneous operating voltage, approximately the same quantity of energy is delivered at startup. Subsequent thereto, a check is made as to whether that quantity of energy is to small or too large, and corresponding corrective measures are taken, as appropriate, to apply a consistent quantity of energy.

BRIEF FIGURE DESCRIPTION

Further details and advantageous refinements of the invention are evident from the exemplifying embodiments, in no way to be understood as a limitation of the invention, that are described below and depicted in the drawings.

DETAILED DESCRIPTION

Figure 1:
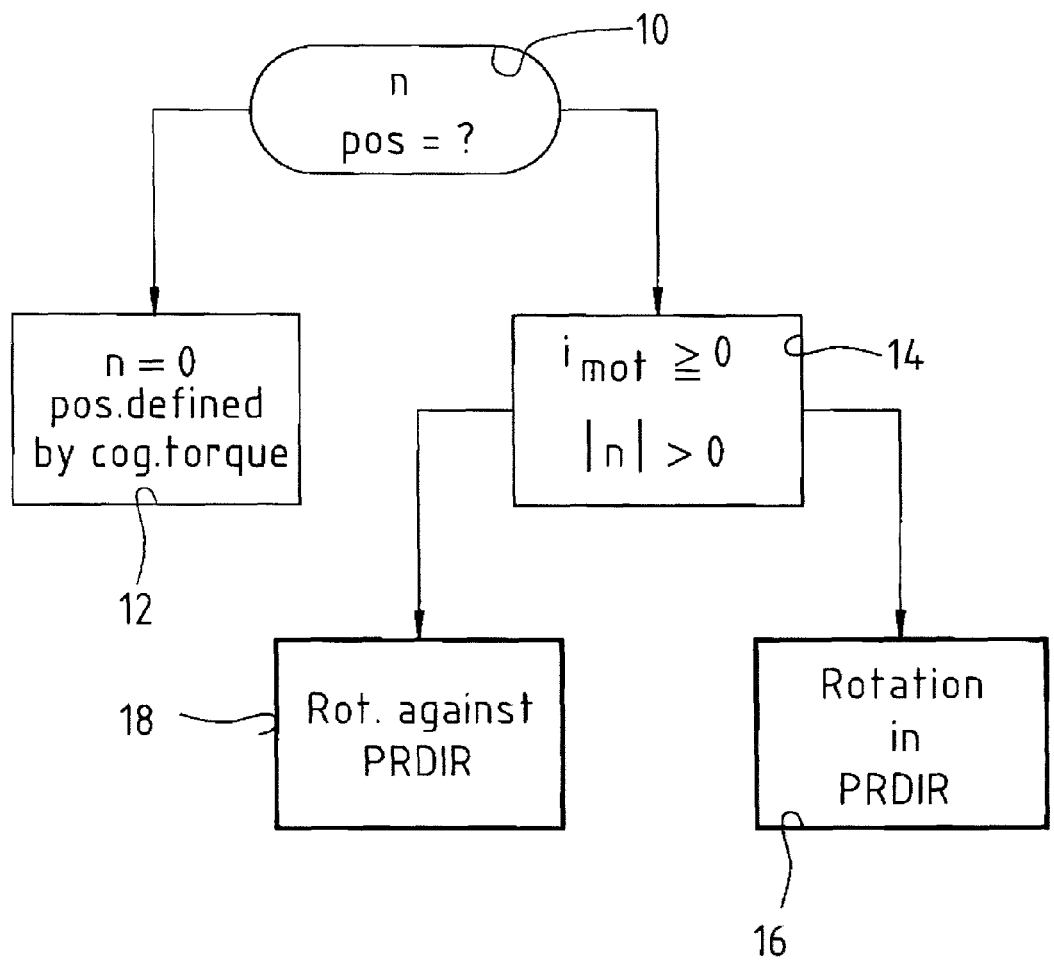
FIG. 1 is an overview diagram that schematically shows various situations that can occur during operation of a sensorless one-phase motor and must therefore be taken into account in its software, in order to ensure reliable starting.

The diagram of FIG. 1 schematically shows problems that must be taken into account, when developing a "sensorless one-phase ECM."

After being switched on, the motor is in situation 10 of FIG. 1, i.e. it has either a rotation speed n=0 or (if externally driven) a rotation speed n≠0, and its rotational position "pos" is unknown (to the motor's electronic control circuit), since a rotational position sensor is not present.

According to situation 12, this can mean that the rotation speed is zero, and the rotor is in one of its cogging positions that is defined by the cogging torque.

The motor can, however, also be in situation 14, meaning that an external driving force is acting on it. In the case of a fan, for example, a wind gust or a storm can be driving the motor, so that, although it is receiving little or no motor current, its rotation speed n is nevertheless not equal to zero, since the rotor (in the case of a fan) can be driven like a windmill by a storm.

Under these conditions, however, the motor can also run in both rotation directions (see positions 16 and 18 of FIG. 1) while the normal motor current is flowing. If the motor is rotating in the wrong rotation direction, corresponding countermeasures are then necessary. The "wrong" rotation direction thus means that reversing must occur after startup.

Step 14 measures whether an induced voltage $u_{ind}$ is present, i.e. whether the magnitude of $u_{ind}$ is greater than zero. This can also be the case, for example, when a fan is being passively driven by wind. In addition, a measurement is made as to whether the magnitude of rotation speed n is greater than zero.

If the response to both queries is NO, the program goes to step 12, which indicates that the rotation speed has a value of zero, and also that the rotational position of the rotor is defined by the so-called cogging torque, i.e. the rotor has "snapped" into one of its cogging positions.

If the responses in step 14 are YES, the rotor is either rotating in its preferred direction PRDIR (step 16) or rotating oppositely to its preferred direction PRDIR (step 18). The rotation direction cannot, however, be immediately deduced from the available data.

The motor can, however, also rotate in either of the two rotation directions as a result of external influences; the normal motor current is flowing, but the motor can rotate in the wrong direction. The "wrong" rotation direction means that it must be reversed after starting.

Figure 2:
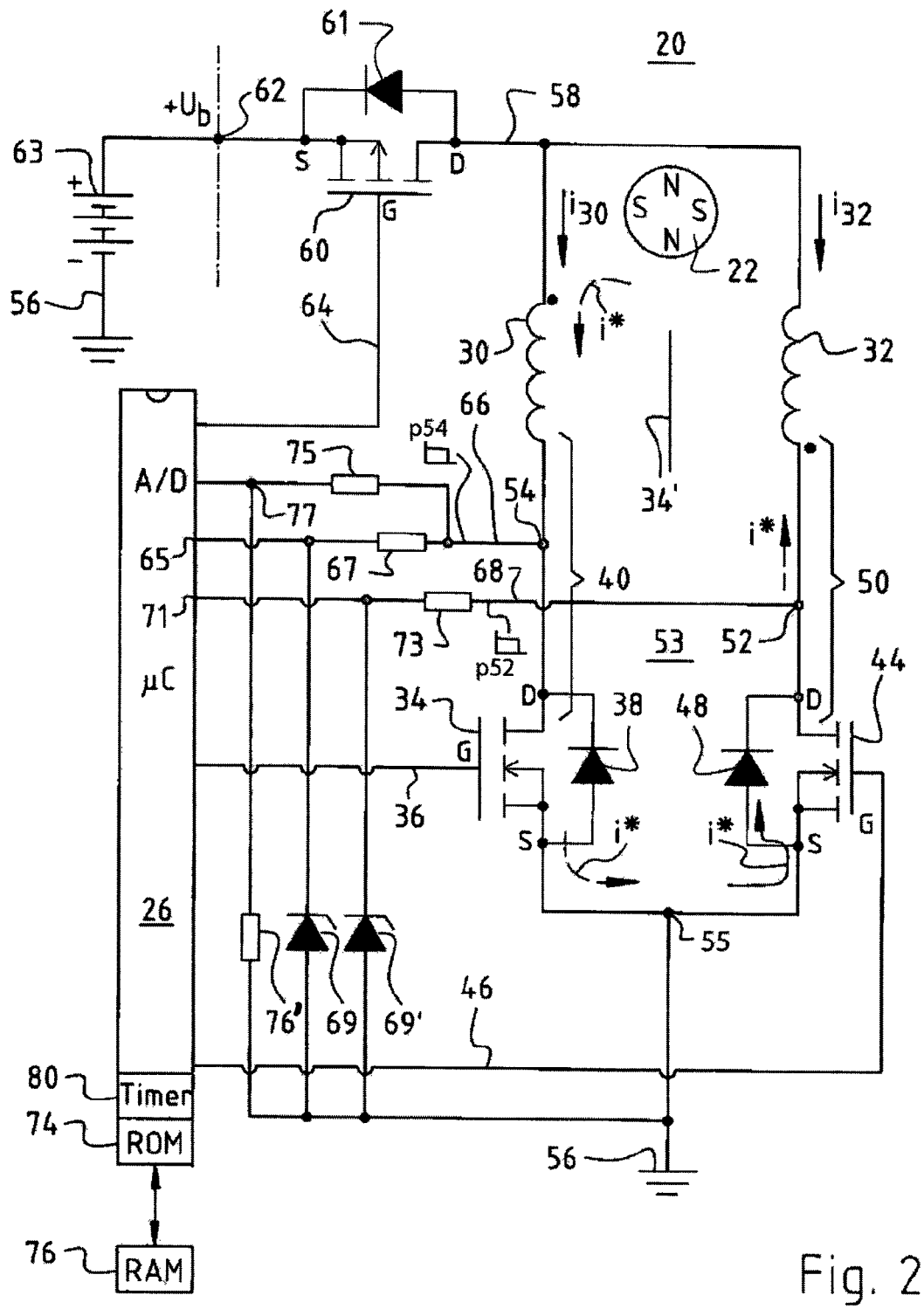
FIG. 2 is a schematic depiction to explain an ECM that operates with a reluctance torque.

FIG. 2 shows the circuitry of an Electronically Commutated Motor (ECM) 20 that operates in sensorless fashion. Motor 20 has a permanent-magnet rotor 22 (indicated merely schematically) that is depicted with four poles, but can also have four, six, eight, etc. poles. Rotor 22 can be an internal rotor, external rotor, the rotor of a motor having a flat or conical air gap, etc.

Motor 20 has a microcontroller (μC) 26, preferably a PIC12F629 from Microchip Technology, Inc., Chandler, Ariz., 85224, USA. It can include a ROM 74, RAM 76, and timer 80, as shown in FIG. 2. The power supply system of μC 26 is, as usual, not depicted. Motor 20 has two stator winding strands 30, 32 that are usually magnetically coupled via the magnetic circuit of the motor, as indicated by symbol 34'. Placed in series with first winding strand 30 is a first semiconductor switch, here e.g. an n-channel MOSFET (Metal Oxide Semiconductor Field Effect Transistor) 34, which has a recovery diode 38 connected antiparallel to it and which is controlled by μC 26 via a control line 36. Together with semiconductor switch 34 and diode 38, strand 30 forms a first series circuit 40 that can optionally contain further elements.

Located in series with second strand 32 is a second controllable semiconductor switch 44 that is controlled by μC 26 via a control line 46. This switch can likewise be an n-channel MOSFET 44 that has a recovery diode 48 connected antiparallel to it. Together with second semiconductor switch 44, second strand 32 forms a second series circuit 50 that may contain further elements.

As FIG. 2 shows, the two series circuits 40, 50 are connected in parallel, to form a parallel circuit 53 whose bottom node 55 is connected to ground 56. The upper ends of strands 30, 32 are also connected to a DC link circuit 58. This means that when semiconductor switch 34 is conductive, a current i30 flows from link circuit 58 through first strand 30, and when semiconductor switch 44 is conductive, a current i32 flows through strand 32. This statement must, however, be modified for the time intervals just before a commutation, as will be explained below.

Link circuit 58 is connected via a third semiconductor switch 60 (here a p-channel MOSFET) to a motor terminal 62 to which a positive voltage Ub, e.g. 12, 24, 48, 60 V, etc. is applied toward ground 56 during operation. A DC source 63 of any kind is depicted symbolically. A power supply, for example, often serves as a DC source.

A diode 61 can be located antiparallel to third semiconductor switch 60. Third semiconductor switch 60 is controlled by μC 26 via a control line 64.

A potential from drain D of semiconductor switch 34 is delivered to a comparator input 65 of μC 26 through a sensor line 66 and a resistor 67. Input 65 is connected via a Zener diode 69 to ground 56, in order to protect said input from overvoltage.

A potential from drain D of second semiconductor switch 44 is likewise delivered to a comparator input 71 of μC 26 through a sensor line 68 and a resistor 73. Input 71 is connected via a Zener diode 69' to ground 56, in order to protect input 71 from overvoltage.

In addition, a voltage divider, made up of two resistors 75, 76', whose connecting node 77 is connected to input A/D of an analog-to-digital converter in μC 26, is connected between drain D of first semiconductor switch 34 and ground 56.

Measuring Ub

This measurement is made via voltage divider 75, 76'. The latter of the two resistors is dimensioned so that the internal reference voltage (in this case 5 Volts) of the A/D converter in μC 26 cannot be exceeded. This precludes measurement errors. Alternatively, this voltage divider can also be placed between source S of third semiconductor switch 60 and ground 56.

Voltage divider 75, 76' also, additionally, has another function: depending on the amplitude of the voltages that are induced in strands 30, 32, said voltages are limited by protective diodes 69, 69'. It is important for rotation direction detection, however, to sense the shape of the induced voltages at inputs 65 and 71, respectively, which would be prevented by voltage limiting. In this instance, the induced voltage is therefore sensed by voltage divider 75, 76' and input A/D of μC 27, with the result that the shape of the induced voltage can also be detected.

The signals at drains D of first semiconductor switch 34 and of second semiconductor switch 44 are sensed at comparators 65, 71 in μC 26.

Manner of Operation of FIG. 2

Figure 3:
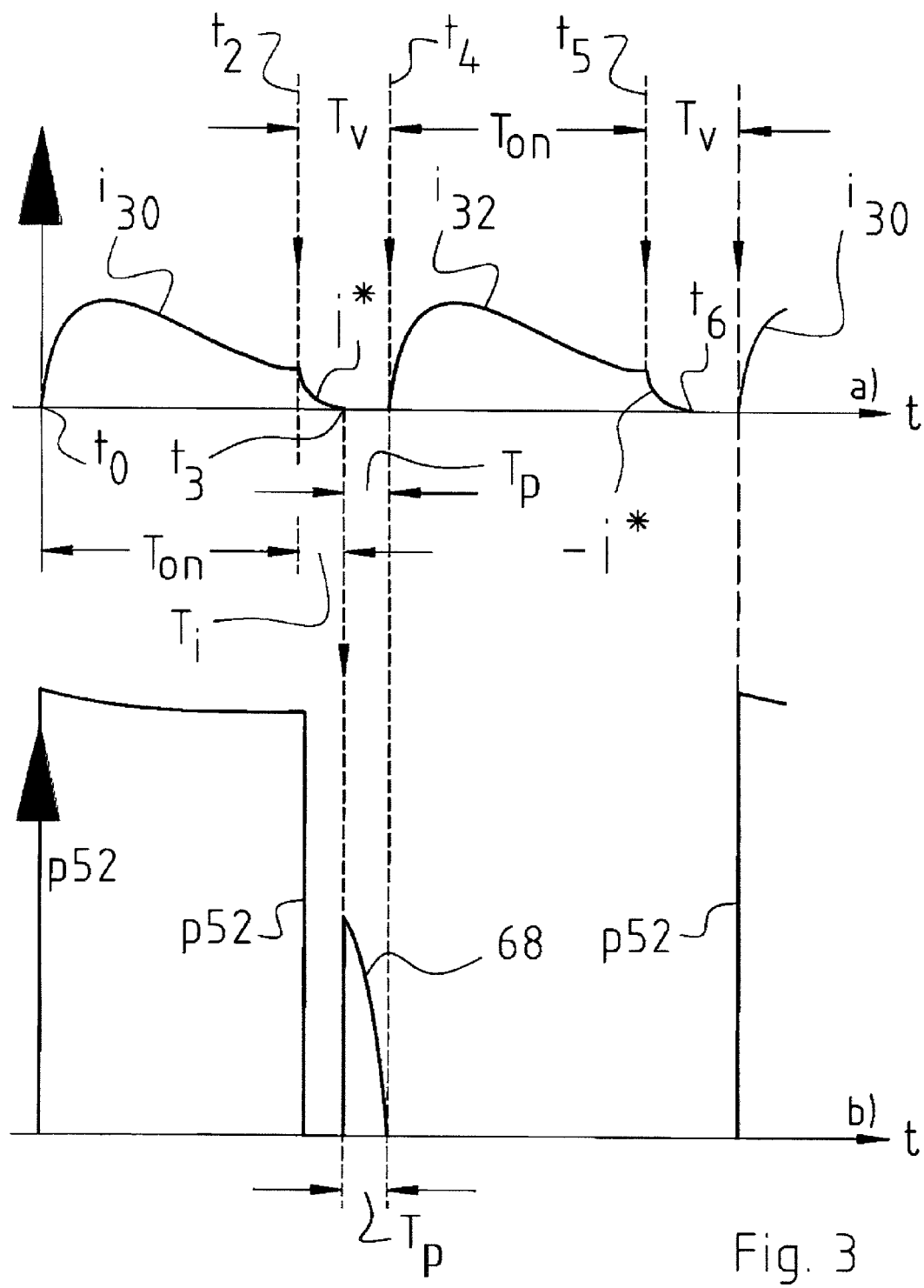
FIG. 3 is a circuit diagram of an embodiment of a one-phase motor that is configured to take into account situations of FIG. 1, the motor being illustrated as a two-strand motor.

Reference is made for this purpose to FIG. 3. Shortly before time instant t0 in FIG. 3, all three semiconductor switches 34, 44, 60 in FIG. 2 are blocked, and motor 20 consequently receives no energy from terminal 62, i.e. energy delivery from DC source 63 is blocked.

At time t0, transistors 34, 60 are switched on by μC 26 so that a current i30 flows from terminal 62 through transistor 60, link circuit 58, strand 30, and transistor 34 to ground 65. FIG. 3a) shows the shape of current i30, which of course depends on the value of the motor rotation speed and on other factors.

Commutation time instant t0 is followed by a commutation time instant t4, at which transistor 34 is switched off and transistor 44 is switched on, so that current i30 is shut off and current i32 (through strand 32) is switched on.

Located in a time interval Tv before t4 is a time instant t2 at which transistor 60 becomes blocked, so that energy delivery from terminal 62 is interrupted, i.e. no energy is delivered from DC source 63 to motor 20 during this time period Tv.

A specific current I flows in strand 30 shortly before time t2, so that a specific energy E is stored in strand 30 in accordance with the formula $$E = 0.5 * L * i^2 \quad (1)$$

where
E=energy stored in the magnetic field of the relevant strand
L=inductance of that strand
I=current at time instant t2.

This stored energy now causes a loop current I* to flow through strand 30 because transistor 34 is still conductive. This loop current I* flows from the lower terminal of strand 30 through transistor 34, node 55, recovery diode 48, and the two strands 32 & 30 so that, as before, it generates a driving torque on rotor 22, with the result that loop current I* rapidly drops and, at time instant t3 of FIG. 3 reaches a value of zero. Transistor 34 can therefore be blocked in a wattless manner as of time instant t3, since loop current I* has become zero.

Measuring Operating Voltage Ub

It is important for startup purposes to know the operating voltage Ub of the motor. While most ECMs have a fixed operating voltage, they can also be operated in an extended range of operating voltages. ECMs for a voltage of 48 V should therefore be able to be operated within a voltage range extending approximately from 36 V to approximately 72 V. The result of these voltage differences is to produce, for the same current-flow duration, very different rotor accelerations for the first current-flow block: the rotor is more strongly accelerated at higher operating voltages, and it may happen that the change in induced voltage is therefore not detected, so that commutation cannot take place. In order to ensure detection of the induced voltage after the first current-flow block, the first current-flow blocks must be adapted with respect to the operating voltage. When the motor is at a standstill, the operating voltage can be identified very easily by way of voltage divider 75, 76' and the A/D converter in microcontroller 26 which digitizes the analog operating voltage signal from the voltage divider. This can be done by switching on semiconductor switch 60 and switching off the two power stage transistors 34 and 44. In this case, the operating voltage is measured directly at drain terminal D of power stage transistor 34.

If the motor is additionally being driven from outside (referred to as an "external driving force"), an induced voltage additionally occurs at the measuring points of the winding. This voltage is overlaid on the operating voltage, and the latter therefore cannot reliably be detected. In this case, the operating voltage can be measured at a point upstream from transistor 60. This variant, however, requires additional circuit complexity. One solution is to proceed in such a way that when an external driving force is identified, the induced voltage and its zero crossings are observed. This is possible if all three semiconductor switches are left nonconductive, with the result that no operating voltage is present at winding strands 30, 32, and the change in induced voltage can be observed. When a zero crossing of the induced voltage then occurs, transistor 60 is switched on and the operating voltage is then present at the winding strands. At that moment, the induced voltage has no influence, and only the operating voltage is measured. Depending upon the rotation speed, this method must function very quickly, since before and after the zero crossing the induced voltage has a steep edge slope that might otherwise cause measurement errors.

In addition to the lack of information about rotor position, there are other important factors that require attention in the context of a sensorless startup. Different winding resistance values, and hence different winding currents and different startup torques, occur, depending upon the operating voltage, winding design, and winding temperature. The startup torque is opposed by frictional torques that change with temperature and with the age of the motor. Attention must also be paid to the differences in axial moment of inertia among different rotors. Different angular accelerations are also produced depending on the rotation direction.

If the angular acceleration achieved by means of the first current-flow block is sufficient for evaluation of the voltage induced by the rotor, this makes it possible to ascertain the rotation direction in which the rotor was accelerated. This means that the first current-flow block that is selected must not be too long, so that after current flow and after the subsequent current loops, the induced voltage can also be measured.

If an induced voltage cannot be measured after the first current-flow block (during time period $T_{on}$ of FIG. 3), there may be various reasons for this. The motor may have been blocked by an external influence; or the first current-flow block was set too short, and as a consequence of increased bearing friction, aging, or a high winding resistance, the electrical torque generated would then not be enough to accelerate the rotor sufficiently. In this case, an induced voltage cannot be identified. Provisions must be made for all these different instances.

Figure 4:
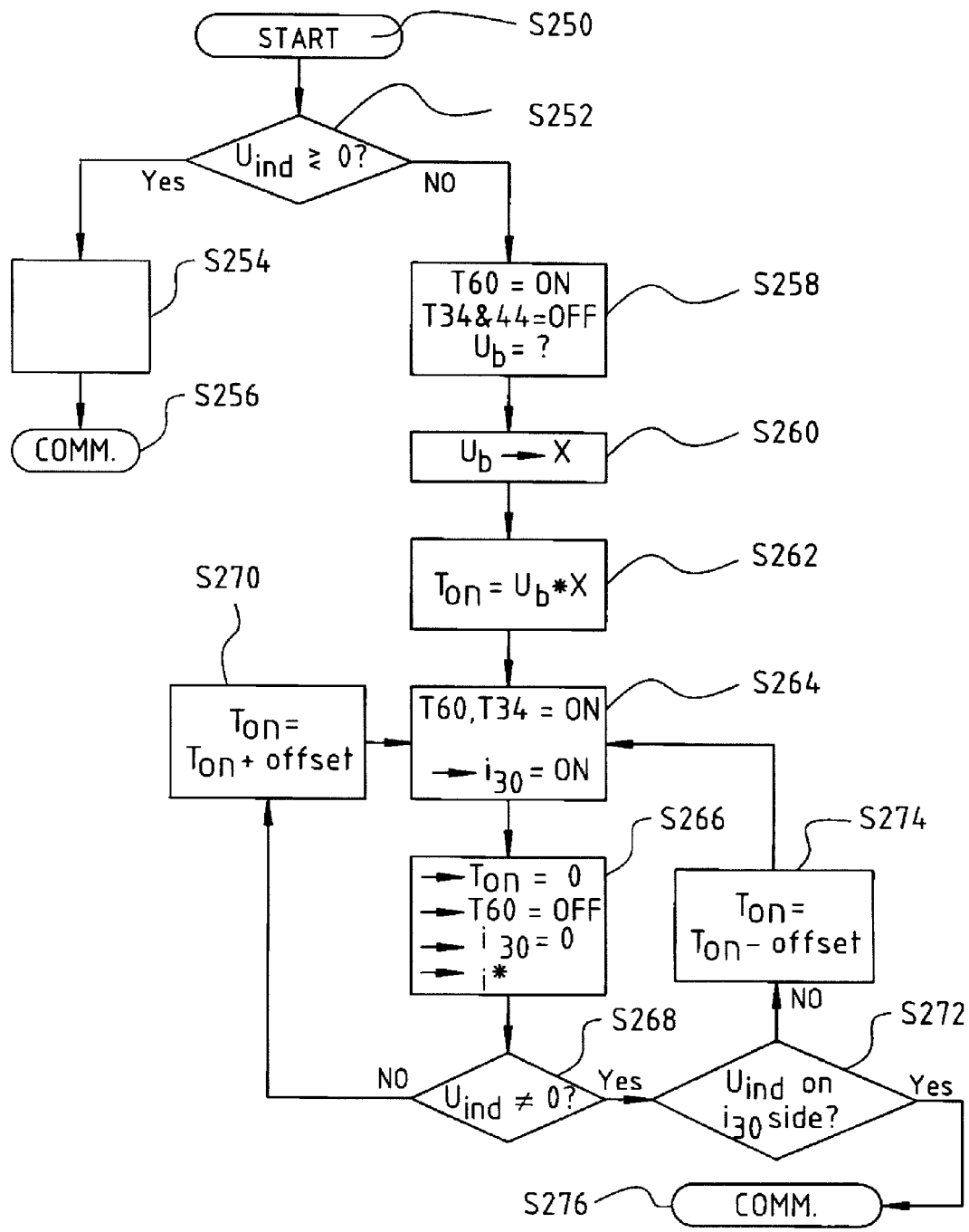
FIG. 4 is a depiction to explain FIG. 3.

FIG. 4 shows a starting routine for the normal case, in which rotor 22 is in a predetermined rotational position from which it is to be started.

Starting occurs at S250. S252 checks whether the induced voltage Uind differs from zero, i.e. checks whether rotor 22 is rotating. If YES, the program goes to a special routine 254 for startup, and then (at S256) transitions into a standard commutation in the desired rotation direction. One such commutation is described below with reference to FIG. 5.

If the response at S252 is No, the program goes to step S258, where transistor 60 is switched on and transistors 34 and 44 are switched off, in order to measure the operating voltage Ub at input A/D of μC 26.

In the next step S260, a factor x is derived (for example from stored tables) from Ub and optionally from other factors or parameters, e.g. the instantaneous temperature, and in S262 the operating voltage Ub is multiplied by this factor in order to calculate the duration $T_{on}$ of the switch-on current pulse that is calculated on a predictive basis for startup of motor 20.

The two transistors 60 and 34 are then switched on at S264, with the result that current i30 through strand 30 is switched on and rotor 22 is accelerated.

After time $T_{on}$ calculated in step S262 has elapsed, in step S266 transistor 60 is switched off, thereby interrupting energy delivery from current source 63. But because transistor 34 is still conductive, the magnetic energy stored in winding strand 30 causes a loop current I* to flow from node 54 through transistor 34, recovery diode 48, and the two winding strands 32 and 30 back to node 55, and this loop current I* drives rotor 22 and thereby rapidly drops to zero.

As long as loop current I* is flowing, drains D of the two transistors 34 and 44 are at ground potential; but when I* has become equal to zero, an induced voltage $u_{ind}$ indicating the rotation of rotor 22 is obtained at drain D of transistor 34. This voltage is sensed in step S268.

If it is not possible to sense any such induced voltage, the program goes to step S270, where time span $T_{on}$ is extended by an amount equal to an "Offset" value; the program then goes to step S264 in order to repeat the startup attempt at an increased energy.

If the response in S268 is YES, S272 checks whether the induced voltage at the drain of transistor 34 can be measured. If NO, time span $T_{on}$ is too long, and in S274 it is therefore shortened by an Offset correction time, in order to weaken the startup current pulse.

The program then goes to step S264 in order to repeat the startup operation at reduced energy. If, however, the response in S272 is YES, i.e. if the induced voltage does occur at the drain of transistor 34, this means that the loop current has dropped to zero at the correct time, and the program goes to step S276 where ECM 20 is commutated normally. In this case, motor 20 is running normally, and motor 20 usually starts without difficulty.

Optimizing Commutation Time t4

Optimized commutation is important for optimum and low-loss operation of motor 20, since the motor then runs quietly with good efficiency.

Commutation optimization is of course particularly difficult with a sensorless motor because a rotor position sensor is not present, so that optimization requires working with other variables that can be measured.

FIG. 3 shows at a) the currents i30, i32 in the two strands 30 and 32 of motor 20. The potential p52 at node 52 of FIG. 2, i.e. at drain D of FET 44, is depicted at b). Because the arrangement is symmetrical, the potential p54 at node 54 has the same profile but offset 180°, and is therefore not depicted in FIG. 3.

As long as FET 44 is conductive, its drain D is connected to ground 56, so that a voltage induced by the permanent-magnet rotor 22 in strand 32 cannot be measured at node 52.

As soon as current I* has dropped to zero, however, this induced voltage (labeled in FIG. 3b) as 68) can be measured at node 52, so that the occurrence of voltage 68 means that loop current I* has dropped to zero; this is the case at time t3, and means that as of that time wattless commutation can take place.

Time span Tv, between time t2 at which FET 60 becomes blocked and current i30 is thereby switched off, and time t4 at which FETs 44 and 60 are switched on, so that a current i32 which flows through strand 32, therefore has an optimum value when time span Tp between times t3 and t4 becomes as short as possible, since Tv then also has a minimal value.

On the other hand, of course, Tv must not become too short, since then the switching on of current i32 (time t4) would fall in a time period Ti (between t2 and t3) in which loop current I* is still flowing, so that wattless commutation would not be possible.

In this case, time span Tv must therefore be extended.

Figure 5:
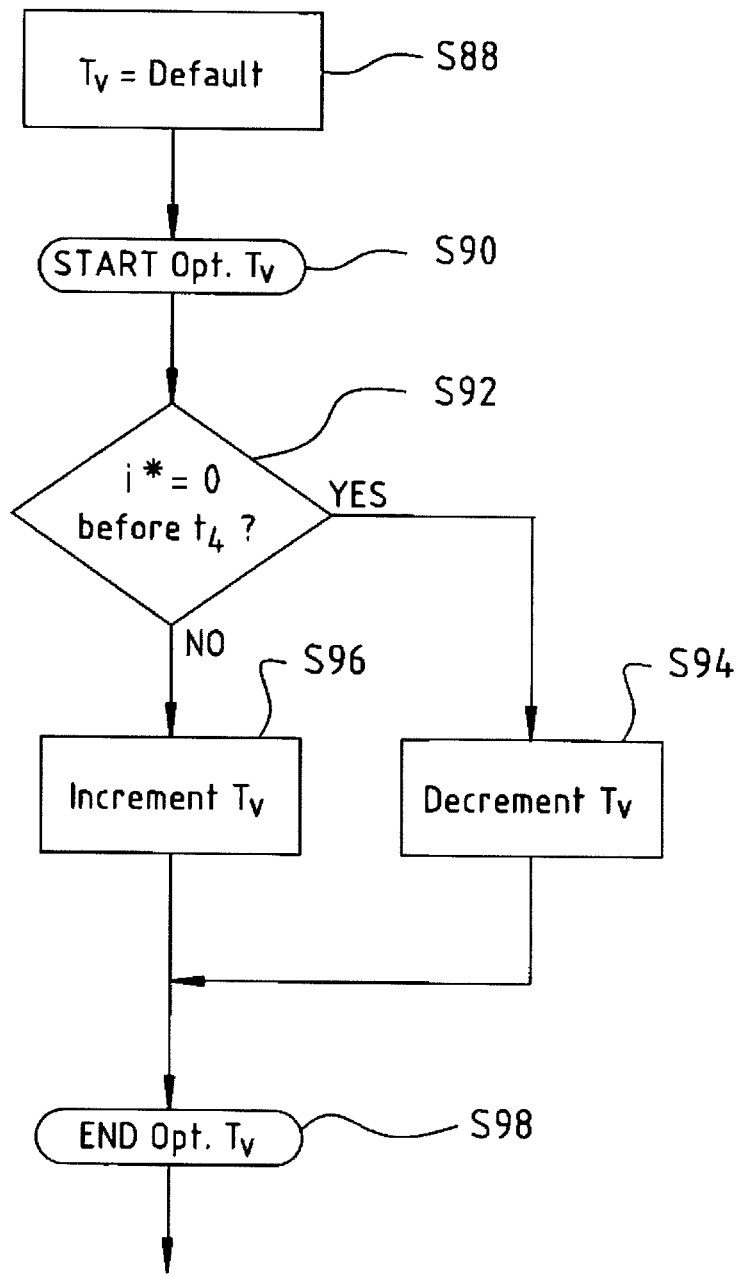
FIG. 5 shows a routine to optimize a time period Tv whose length is important for optimum commutation.

The operations depicted in the flow charts of FIGS. 4 and 5 serve this purpose.

Time Tv (FIG. 3), which is set at the startup of motor 20 to a default value, and at the beginning of which (at time t2) the "prelude" to each commutation begins, can be optimized by means of µC 26. The corresponding routine is depicted in FIG. 5.

This routine begins at step S88 and is preferably called at each commutation. In S88, Tv is set to a default value after switching on. The optimization of Tv begins in S90. S92 checks whether the end (t3) of current looping was detected before commutation time t4. If so, Tv is reduced in S94 by an decrement ΔTv1. If not, then in S96 Tv is increased by an increment ΔTv2 that is greater than decrement ΔTv1 in step S94. Optimization ends at step S98.

The result is that an optimum value for Tv is automatically established within a few revolutions, even if the motor rotation speed has changed as a result of external influences, e.g. an air current.

Problems at Higher-Order Transistor 60

At startup or in the event of a change in the load on motor 20, it may happen that the higher-order transistor 60 becomes blocked too late, and a loop current is therefore still flowing through strands 30, 32 at the commutation time. A currentless commutation is not possible in such a case, and protective measures must be taken to prevent this.

One possibility here is to use a link circuit capacitor, which is arranged between link circuit 58 and ground 56 and which absorbs the residual magnetic energy of the winding strand that is to be switched off and thereby limits the voltage at link circuit 58.

It is also possible to insert a Zener diode between link circuit 58 and ground 56, in order to limit the voltage at link circuit 58.

The drain voltages of FETs 34 and 44 can also be limited, using respective Zener diodes that are arranged between the pertinent drain D and ground 56.

Another, and possibly additional, action is to limit the drain voltages of FETs 34, 44 by slow switching. This can be achieved using a series circuit of a capacitor and a resistor that is connected between drain D and gate G of the relevant FET.

The drain voltages of FETs 34, 44 can also be limited by slow switching of the relevant FET. This can be done using a series circuit of a Zener diode 124 and a resistor 126. In this case, a series circuit of this kind is inserted between D and G of the relevant transistor.

Current limiting can additionally be provided for motor 20. This is not depicted in FIG. 2, so as not to make the depiction difficult to understand as a result of a proliferation of elements. Current limiting is preferably achieved by blocking higher-order transistor 60 in the event of an overcurrent, in order to interrupt energy delivery from DC source 63 to motor 20. This results in a respective loop current I* as already described, and this loop current generates a torque, thus yielding current limiting with highly efficient motor operation.

Many variations and modifications are, of course, possible within the scope of the inventive concept.

What is claimed is:

1. An electronically commutated one-phase motor (20) comprising:

a stator having a permanent-magnet rotor (22) and two winding strands (30, 32), each of which is connected in series with a respective associated semiconductor switch (34, 44), thereby forming first and second series circuits (40, 50) having, upstream from them, a third semiconductor switch (60) which, when blocked, interrupts current delivery from a DC power source (63) to the motor (20), at least one of the two winding strands having a first end and a second end, the first end being connected to a supply lead (58) for supplying an operating voltage from said DC power source (63), the second end being connected to an associated semiconductor switch (34, 44), wherein the at least one permanent-magnet rotor (22) induces, as it rotates, a voltage ($u_{ind}$) in said at least one of the two winding strands (30, 32);

an electronic calculation device (26) which is configured to execute, during operation, the steps of:

a) measuring an analog instantaneous operating voltage (Ub) of the motor and deriving therefrom a digital voltage value characterizing said instantaneous operating voltage;

b) specifying a time duration ($T_{ON}$) of a switch-on current pulse (i30) applied to the motor, based upon at least one motor operating parameter, including as a parameter said digital voltage value;

c) switching space on said third semiconductor switch (60) for said time duration ($T_{ON}$) to apply said switch-on current pulse (i30) to a predetermined winding strand (30) of the motor, to cause a current flow in said predetermined winding strand (30);

d) after said time duration ($T_{ON}$) has elapsed, interrupting energy delivery to the motor so that, as a result of magnetic energy stored in the motor (20), a current (I*) is briefly generated, that loops in the motor and flows through the predetermined winding strand (30), which current is referred to hereinafter as a loop current;

e) monitoring as to whether or not an induced voltage occurs after the end of the loop current (I*);

f) if no induced voltage is detected, extending the time duration ($T_{ON}$) of the switch-on current pulse (i30), and repeating, during that extended time duration, a starting operation;

g) if an induced voltage does occur after the end of the loop current (I*), making a check as to whether said voltage is occurring at the predetermined winding strand (30);

h) if No, shortening the time duration ($T_{ON}$) of the switch-on current pulse, and using that shortened time duration, repeating a starting operation;

I) if Yes, executing a transition to normal commutation of the motor (20).

2. The motor according to claim 1, wherein said step of specifying the duration of the switch-on current pulse comprises specifying said duration, based upon both said instantaneous operating voltage and motor temperature.

3. The motor according to claim 1, further comprising a respective recovery diode (38, 48, 61), associated with at least one of the semiconductor switches (34, 44, 60).

4. The motor according to claim 1, wherein the semiconductor switches (34, 44, 60) are implemented as field effect transistors.

5. The motor according to claim 1, wherein said electronic calculation device (26) is a microcontroller (26) configured to control the semiconductor switches (34, 44, 60).

6. The motor according to claim 5, wherein during operation, signals (p52, p54), outputted from the semiconductor switches (34, 44) associated with the respective winding strands (30, 32), are applied (65, 71) to the microcontroller (26) for evaluation.

7. The motor according to claim 6, wherein at least one of the signals from the semiconductor switches (34, 44) is applied (65, 71) to an A/D converter provided in the microcontroller (26), for the purpose of digitizing the value of said analog instantaneous operating voltage (Ub).

8. The motor according to claim 7, wherein during delivery of the signal (p52, p54) serving for measuring of the operating voltage (Ub), current flow, to the at least one winding strand (30, 32), is interrupted.

9. The motor according to claim 1, wherein the electronic calculation device (26) is configured to measure an elapsed-time interval (Tp) between the end of said loop current (I*) and a commutation instant (t4) subsequent thereto.

10. The motor according to claim 9, wherein the electronic calculation device (26) is configured, upon occurrence of said elapsed time interval (Tp), to decrease of said elapsed time interval, in steps.

11. The motor according to claim 9, wherein the electronic calculation device (26) is configured, in the absence of a time interval (Tp) of this kind, to modify (S96) at least one commutation parameter in a direction such that a time interval (Tp) of this kind will occur.

12. The motor according to claim 10, wherein the electronic calculation device (26) is configured, in the absence of a time interval (Tp) of this kind, to modify (S96) at least one commutation parameter in a direction such that a time interval (Tp) of this kind will occur.

* * * * *